(12) United States Patent
Csorgo et al.

(10) Patent No.: US 12,481,725 B2
(45) Date of Patent: Nov. 25, 2025

(54) SYSTEMS AND METHODS FOR DOMAIN-SPECIFIC ENHANCEMENT OF REAL-TIME MODELS THROUGH EDGE-BASED LEARNING

(71) Applicant: Verizon Patent and Licensing Inc., Basking Ridge, NJ (US)

(72) Inventors: Anna E. Csorgo, Budapest (HU); Balint Magyar, Budapest (HU); Domonkos Huszar, Kistarcsa (HU); Mark Szabo, Budapest (HU); Istvan S. Horvath, Budapest (HU); Andras Horvath, Budapest (HU); Csaba Rekeczky, Far Hills, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1268 days.

(21) Appl. No.: 17/224,858

(22) Filed: Apr. 7, 2021

(65) Prior Publication Data

US 2022/0327333 A1  Oct. 13, 2022

(51) Int. Cl.
*G06N 20/00* (2019.01)
*G06F 18/214* (2023.01)
*G06F 18/241* (2023.01)
*G06V 20/58* (2022.01)

(52) U.S. Cl.
CPC .......... *G06F 18/241* (2023.01); *G06F 18/214* (2023.01); *G06N 20/00* (2019.01); *G06V 20/58* (2022.01)

(58) Field of Classification Search
CPC combination set(s) only.
See application file for complete search history.

(56) References Cited

U.S. PATENT DOCUMENTS 10,911,747 B1   2/2021  Kiss et al.

OTHER PUBLICATIONS

Chung ("ShadowTutor: Distributed partial distillation for mobile video DNN inference") arXiv:2003.10735v2 [cs.DC] Jun. 5, 2020 (Year: 2020).*
Valverde ("There is More than Meets the Eye: Self-Supervised Multi-Object Detection and Tracking with Sound by Distilling Multimodal Knowledge") arXiv:2103.01353v1 [cs.CV] Mar. 1, 2021 (Year: 2021).*

(Continued)

*Primary Examiner* — Shahid K Khan
*Assistant Examiner* — Su-Ting Chuang

(57) ABSTRACT

Techniques described herein provide for the use of a heterogeneous artificial intelligence/machine learning ("AI/ML") architecture, in which relatively complex AI/ML, techniques may be used in conjunction with more lightweight AI/ML techniques in order to leverage the accuracy of relatively complex AI/ML techniques with the reduced processing power and/or time requirements of more lightweight AI/ML techniques. A teacher model system may utilize processing resource and/or time-intensive AI/ML techniques and/or models in order to determine classifications associated with source data, and may provide such classifications to a student model system that may utilize the classifications in accordance with less processing resource and/or time-intensive AI/ML techniques in order to accurately classify sensor data in real time or near-real time.

20 Claims, 9 Drawing Sheets

(56) References Cited

OTHER PUBLICATIONS

Zhu ("Feature Distilled Tracking") IEEE Transactions on Cybernetics, vol. 49, No. 2, Feb. 2019 (Year: 2019).*
Balzano ("SoCar: a Social car2car framework to refine routes information based on road events and GPS") 2015 IEEE International Conference on Computer and Information Technology (Year: 2015).*
Bazzi ("Distilling Before Refine: Spatio-Temporal Transfer Learning for Mapping Irrigated Areas Using Sentinel-1 Time Series") IEEE Geoscience and Remote Sensing Letters, vol. 17, No. 11, Nov. 2020 (Year: 2020).*
Yigitoglu ("Distributed Orchestration in Large-scale IoT System") 2017 IEEE International Congress on Internet of Things (Year: 2017).*
K. He et al., "Mask R-CNN," Facebook AI Research, Oct. 2017 (available at https://openaccess.thecvf.com/content_ICCV_2017/papers/He_Mask_R-CNN_ICCV_2017_paper.pdf, visited Mar. 5, 2021).

* cited by examiner

US 12,481,725 B2

SYSTEMS AND METHODS FOR DOMAIN-SPECIFIC ENHANCEMENT OF REAL-TIME MODELS THROUGH EDGE-BASED LEARNING

BACKGROUND

Artificial intelligence/machine learning ("AI/ML") techniques may be used for classifying data, predicting events, and/or other operations. For example, such techniques may be used for image recognition, emergency event detection, autonomous driving systems, or other applications. Sophisticated AI/ML models may be highly accurate, but may require large amounts of processing resources and/or time in order to be used.

DETAILED DESCRIPTION OF EXAMPLE EMBODIMENTS

The following detailed description refers to the accompanying drawings. The same reference numbers in different drawings may identify the same or similar elements.

Embodiments described herein provide for the use of a heterogeneous AI/ML architecture, in which relatively complex AI/ML techniques may be used in conjunction with more lightweight AI/ML techniques in order to leverage the accuracy of the relatively complex AI/ML techniques with the reduced processing power and/or time requirements of the more lightweight AI/ML techniques. For example, as described herein, one or more "far cloud" devices or systems, such as cloud-based systems, virtualized systems, datacenters, or the like may utilize processing resource and/or time-intensive AI/ML techniques and/or models in order to determine classifications, labels, etc. associated with source data, and may provide such classifications, labels, etc. to "edge" devices (e.g., Multi-Access/Mobile Edge Computing ("MEC") devices, referred to sometimes herein simply as "MECs"), Internet of Things ("IoT") devices, or other devices. These edge devices, or other devices, may perform edge-based learning by utilizing the classifications, labels, etc. in accordance with less processing resource and/or time-intensive AI/ML techniques in order to generate and/or refine models, which may be used to accurately classify data, such as visual data (e.g., as captured via one or more cameras), data captured by one or more sensors or "smart" devices, and/or other data.

As further described herein, the classifications, labels, etc. may be tailored to particular edge devices or sets of edge devices, such that the relatively complex AI/ML techniques performed by the cloud-based systems, virtualized systems, etc. may be more relevant to respective data measured or captured by particular sets of edge devices (e.g., specific to particular geographical regions, types of environments, etc.). As referred to herein, the term "classification" may refer to a technique using AI/ML techniques, neural network techniques, or other suitable techniques to analyze data, extract and/or identify features associated with the data, determine predictions associated with the data, and/or other suitable operations.

Figure 1:
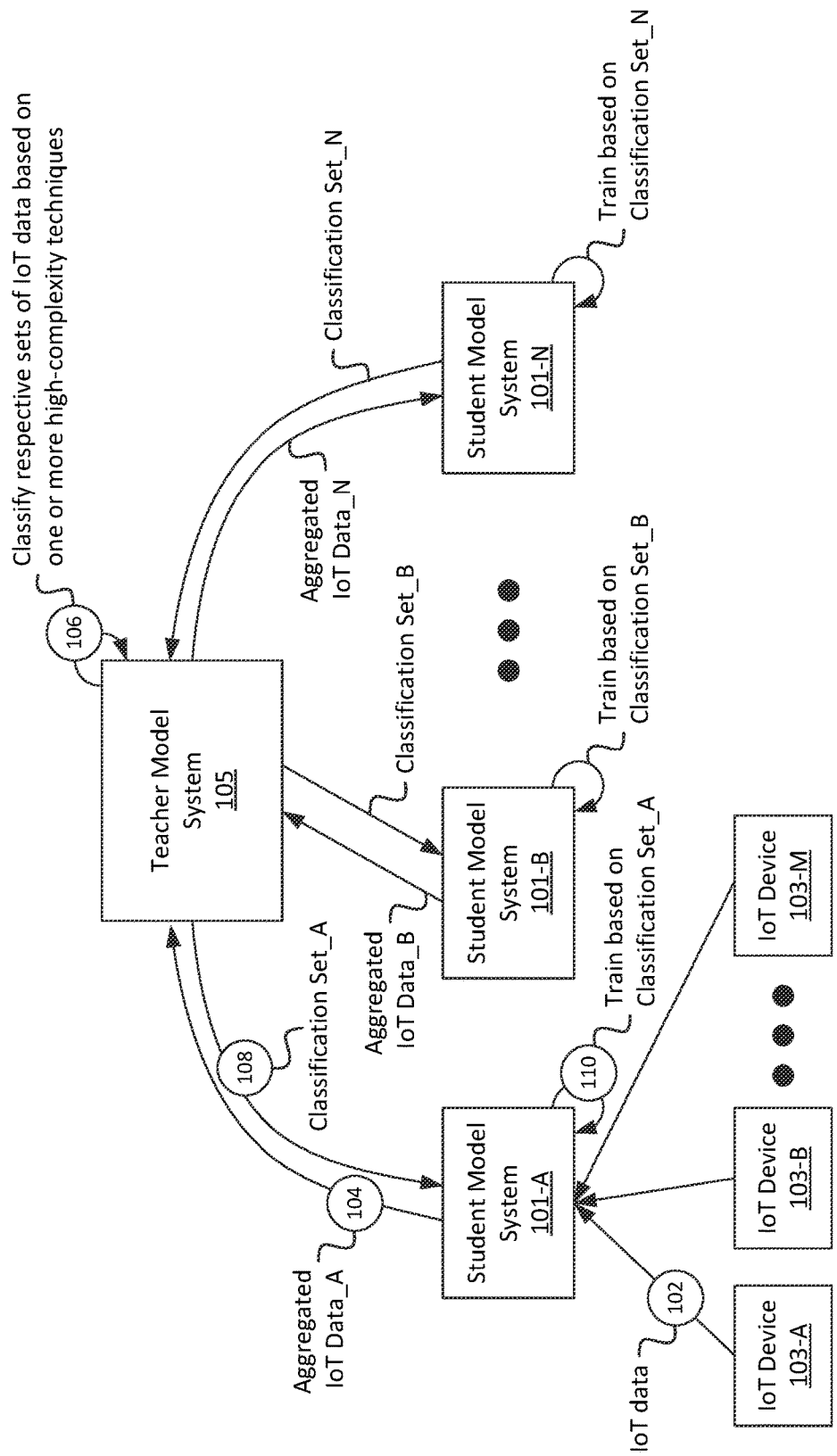
FIG. 1 illustrates an example overview of one or more embodiments described herein.

As shown in FIG. 1, for example, a group of student model systems 101 may be deployed (e.g., student model system 101-A, student model system 101-B, and/or student model system 101-N). For example, as discussed below, each student model system 101 may be associated with a particular geographical region, a particular base station of a radio access network ("RAN") of a wireless network, a particular MEC, or the like. In some embodiments, multiple student model systems 101 may be deployed within a given region, may be associated with a particular base station, and/or may be associated with a particular MEC. In some embodiments, a particular student model system 101 may be associated with multiple geographical regions, multiple base stations, and/or multiple MECs. In some embodiments, student model system 101 may be associated with a set of IoT devices 103. While IoT devices 103 are used as examples herein, in practice, embodiments may be used in accordance with other types of devices, such as User Equipment ("UEs"), Machine-to-Machine ("M2M") devices, and/or other suitable devices. In some embodiments, a "group" of IoT devices 103 may refer to IoT devices 103 that are deployed in the same geographical region, IoT devices 103 of the same type (e.g., camera, thermostat, smoke alarm, etc.), IoT devices 103 associated with a same user or other entity (e.g., an organization, an individual, an institution, etc.), and/or some other discrete grouping.

IoT devices 103 may include sensors or other types of devices that are capable of measuring, sensing, recording, determining, etc. data or metrics, such as visual data, audio data, temperature, atmospheric pressure, humidity, air particulate matter concentration, and/or other types of data. Generally, each group of IoT devices 103 may be subject to conditions that may vary from group to group, but may be the same or similar within each group. For example, a first group of IoT devices 103 may be or may include a set of cameras situated within a parking lot, while a second group of IoT devices 103 may be or may include a set of cameras situated within a train station. The first group of IoT devices 103 may typically capture video data depicting passenger automobiles, small groups of pedestrians or individual pedestrians, parking spot markings, or the like. The second group of IoT devices 103 may typically capture video data depicting trains, large groups of train passengers, train tracks, or the like. That is, the type of data captured by the first group of IoT devices 103 may be similar to data captured by other IoT devices 103 within the first group, but different from data captured by IoT devices 103 of the second group.

In the example here, each student model system 101 may be associated with a particular group of IoT devices 103. For example, student model system 101-A may be associated with IoT devices 103-A, 103-B, and 103-M. While not shown for the sake of conciseness, student model system 101-B may be associated with a second set of IoT devices 103, and student model system 101-N may be associated with a third set of IoT devices 103. As discussed below, IoT devices 103 may communicate with respective student model systems 101 via one or more networks, application programming interfaces ("APIs"), or other suitable communication pathways. As shown, student model system 101-A may receive (at 102) IoT data from IoT device 103-A, 103-B, and/or 103-M. For example, student model system 101-A may receive streaming data (e.g., on a continuous basis), periodically and/or intermittently (e.g., on a set interval, on an event-driven basis, or some other intermittent basis), and/or otherwise on an ongoing basis. In some embodiments, the IoT data may be based on real-world measurements, events, or phenomena. In some embodiments, the IoT data may be simulated data generated based on one or more simulations. As noted above, the IoT data may include one or more sensor readings, captured audio and/or video, and/or other suitable type of data collected, measured, or determined by IoT devices 103. As used herein, "sensor data" may accordingly refer to such data (e.g., one or more sensor readings, captured audio and/or video, and/or other suitable type of data collected, measured, or determined by IoT devices 103 and/or other types of devices with components that are able to measure, sense, detect, etc.).

As further shown, student model system 101-A may output (at 104) aggregated IoT data (shown as "IoT Data_A," which may be separate from "IoT Data_B" associated with student model system 101-B and from "IoT Data_N" associated with student model system 101-N) to teacher model system 105. The aggregated IoT data may include a "batch" of data associated with the group of IoT devices 103 (e.g., IoT devices 103-A, 103-B, and 103-M) associated with student model system 101-A. In some embodiments, the aggregated data may be "stitched" together, such as a composite video or image based on videos or images from multiple ones of IoT devices 103-A, 103-B, and/or 103-M, an average and/or median value of one or more sensor readings associated with IoT devices 103-A, 103-B, and/or 103-M, or the like. In some embodiments, the aggregated IoT data may be a concatenation or other grouping of the IoT data associated with IoT devices 103-A, 103-B, and/or 103-M. In some embodiments, in lieu of receiving aggregated data from student model systems 101, teacher model system 105 may receive IoT data from IoT devices 103 via an API or other suitable communication pathway.

As similarly shown, teacher model system 105 may receive IoT data (e.g., aggregated IoT data) from, or associated with, student model system 101-B and 101-N. For example, such IoT data may have been measured, sensed, captured, etc. by respective IoT devices 103 associated with student model systems 101-B and/or 101-N. Teacher model system 105 may accordingly classify, categorize, and/or otherwise process (at 106) the received IoT data associated with each group of IoT devices 103 (e.g., associated with each respective student model system 101) using one or more AI/ML techniques. In some embodiments, such techniques may include tracking techniques, filtering techniques, clustering techniques, or other suitable techniques based on which features, attributes, trends, etc. associated with the received IoT data may be extracted, identified, or otherwise determined.

As noted above, such techniques may require, and/or may benefit from, a relatively large amount of processing resources as compared to the processing resources available where the student models are deployed, such as particular processor capabilities (e.g., number of cores, clock speeds, multithreaded capability, etc.), quantities of processors, or the like. Additionally, or alternatively, such techniques may require, and/or may benefit from, a relatively large amount of memory (e.g., Random Access Memory ("RAM") and/or other types of memory), memory with particular clock speeds, or the like. As yet another example, such techniques may require, and/or may benefit from, a relatively large amount of time. As such, the utilization of such techniques may provide extremely accurate classifications of IoT data, but may not necessarily be able to provide such classifications in real time, and/or with the hardware and/or software resources available at edge devices, IoT devices 103, etc.

For example, in example situations where the IoT data includes video data (e.g., where IoT device 103 includes or is communicatively coupled to one or more cameras), teacher model system 105 may perform image-based tracking on the received video data to identify objects or other features depicted at different locations as depicted in the video data. For example, the video data may include multiple frames, where each frame includes an image captured at a particular time or over a particular time period, where a set of frames played back consecutively depict the video data. The image-based tracking may include identifying depicted objects as well as features of such objects over multiple frames, including identifying a trajectory or path associated with such objects. For example, teacher model system 105 may identify a blue car traveling along a particular path (e.g., a road) as depicted in ten consecutive frames, may identify a red car traveling along the same path in the eleventh frame, and may again identify a blue car traveling along the same path in the twelfth frame.

Another tracking technique that may be used by teacher model system 105 to identify objects and/or their features as depicted in video data may include a three-dimensional tracking technique, in which locations, angles, or other attributes of cameras that capture such video data may be used to identify trajectories and/or paths of objects. In some embodiments, another tracking technique that may be used by teacher model system 105 includes an acausal tracking technique, in which locations and/or trajectories of objects may be detected, estimated, or otherwise determined retroactively. For example, acausal tracking may be used to identify a position of an object occluded by another object (e.g., a vehicle that is behind a street sign) in frames 1-10 of a set of frames, based on a detection of the object in one or more subsequent frames (e.g., frame 11, frames 11-20, etc.) in the set of frames.

In some embodiments, tracking techniques may include analyzing the size of depicted objects (e.g., relative to a total size of an image) to identify the path or trajectory of objects. For example, an object increasing in size over time may indicate that the object is approaching a camera, while an object decreasing in size over time may indicate that the object is moving away from the camera.

Based on the tracking techniques (e.g., the tracking techniques described above and/or other suitable techniques), teacher model system 105 may determine that the detection of the red car was erroneous, and that the detected red car was most likely the blue car detected at frames 1-10 and 12. Such techniques may therefore be resistant to detection errors in individual frames by using detections based on other frames to identify objects and their features.

In some embodiments, teacher model system 105 may perform relatively complex filtering techniques to maximize the confidence and/or accuracy of detected objects and their features. For example, teacher model system 105 may utilize confidence score-based filtering, in which teacher model system 105 determines a confidence score associated with a given detection (e.g., the detection of an object and/or attributes of the object) and verifies, invalidates, maintains, removes, etc. detections based on confidence scores that are below a confidence threshold. In some embodiments, multiple thresholds may be used. For example, a confidence score above a first threshold may be associated with a positive detection of an object or feature, a confidence score below a second threshold may be associated with a positive determination that a given data set does not include the object or feature, while a confidence score between the two thresholds may be indicate that no determination was made with respect to whether the data set includes the object or feature, for example by masking those regions. In some embodiments, confidence scores may be affected by factors such as image blurriness, image and/or object size (e.g., an object that occupies relatively less of an image may be identified with lower confidence than an object that occupies relatively more of an image), how closely an object follows a detected trajectory or path, or other factors.

Further, teacher model system 105 may perform some or all of the above techniques with parameters that utilize relatively large amounts of processing resources, memory resources, time, and/or other resources. For example, teacher model system 105 may make multiple passes on a given image or video, may analyze every pixel, bit, or other quantum of received IoT data to perform the above techniques, etc. Further, as noted above, the techniques may be performed as "post-processing" or some other non-real time procedures.

Based on such AI/ML techniques, teacher model system 105 may determine a set of classifications, annotations, labels, categories, etc. (referred to simply as "classifications" for brevity) for each set of IoT data associated with each respective student model system 101. For example, a set of classifications associated with student model system 101-A may be referred to as "Classification Set_A," a set of classifications associated with student model system 101-B may be referred to as "Classification Set_B," and a set of classifications associated with student model system 101-N may be referred to as "Classification Set N." For example, the classifications for student model system 101-A may include information describing or derived from IoT data associated with IoT devices 103-A, 103-B, and/or 103-M. As one example, assume that the IoT data (e.g., the aggregated IoT data, and/or IoT data from individual IoT devices 103) includes moving video data depicting various vehicles. Classification Set_A may include information regarding the depicted vehicles, as determined by teacher model system 105, such as makes and/or models of the vehicles, speeds at which the vehicles were traveling, colors of the vehicles, sizes of the vehicles, condition of the vehicles (e.g., like new condition, good condition, poor condition, etc.), and/or other attributes or classifications that may have been determined using relatively high-complexity AI/ML, techniques.

In some embodiments, Classification Set_A may include "annotations" inasmuch as the classifications may be used to "annotate" source IoT data, or portions thereof, from which such classifications were derived or determined. For example, Classification Set_A may include a timestamp or a time range of video data, a position within one or more video frames, etc. of video data associated with IoT devices 103-A, 103-B, and/or 103-M, as well as one or more classifications. For example, Classification Set_A may include an indication (e.g., an annotation) that an object of type "sedan" was detected at 1:00:01 to 1:00:07 of video data associated with IoT device 103-A, and that the object is further associated with the classifications "fast," "blue," "Make_A Model_A" (e.g., an example hypothetical vehicle make and model), "bald tires," "loud exhaust," and/or other classifications, descriptors, or the like. Continuing with the example above (e.g., where student model system 101-B is associated with a train station), Classification Set_B may include annotated data such as an indication that a particular video depicts, at a particular time range, a 30-car freight train traveling at 200 km/h through a train station.

In accordance with embodiments described herein, student model system 101-A may train (at 110) one or more models based on the received Classification Set_A (e.g., as determined by teacher model system 105). Similarly, student model system 101-B may train one or more models based on the received Classification Set_B, and student model system 101-N may train one or more models based on the received Classification Set N. For example, student model system 101-A may correlate some or all of the annotated IoT data, and/or attributes thereof, with the classifications received from teacher model system 105. In some embodiments, student model systems 101 may utilize less complex AI/ML techniques, and/or may generate less complex models, than those utilized or generated by teacher model system 105. For example, student model system 101-A may forgo utilizing one or more classification, categorization, etc. techniques (e.g., AI/ML techniques) utilized by teacher model system 105. For example, while teacher model system 105 may utilize relatively resource and/or time-intensive techniques (e.g., as discussed above) to generate (at 106) classifications for IoT data associated with respective student model systems 101, student model systems 101 may forgo utilizing one or more of these operations when classifying IoT data (e.g., IoT data received after the classifications are received from teacher model system 105).

For example, student model system 101 may identify objects and/or features based on techniques that forgo utilizing tracking and/or filtering techniques described above. Additionally, or alternatively, student model system 101 may utilize less time and/or resource-intensive techniques than are utilized by teacher model system 105. For example, the hardware resources associated with student model system 101 may be less capable (e.g., fewer processors, processors with fewer cores, processors wherein slower clock speeds, lower amounts of memory, memory with lower clock speeds, etc.) than are associated with teacher model system 105. Further, student model system 101 may process IoT data in real time or near-real time (e.g., may omit post-processing techniques utilized by teacher model system 105).

In this manner, student model systems 101 may make use of relatively processing resource and/or time-intensive classification operations performed by teacher model system 105, without needing to perform such operations themselves. As such, student model systems 101 may be able to be deployed with less processing power than teacher model system 105, while gaining the benefit of advanced classification operations performed by teacher model system 105.

Further, techniques described herein may be readily scalable utilizing cloud-based resources.

For example, once a given student model system 101 receives classifications from teacher model system 105 based on IoT data associated with student model system 101, such classifications may be more heavily weighted in one or more models generated and/or maintained by student model system 101, and/or may be more likely to be utilized than other classifications. Continuing with the above example, student model system 101-A may for instance be more likely to detect automobiles, or particular types of automobiles, that have been previously detected and/or classified (e.g., by teacher model system 105) than other types of objects.

Figure 2:
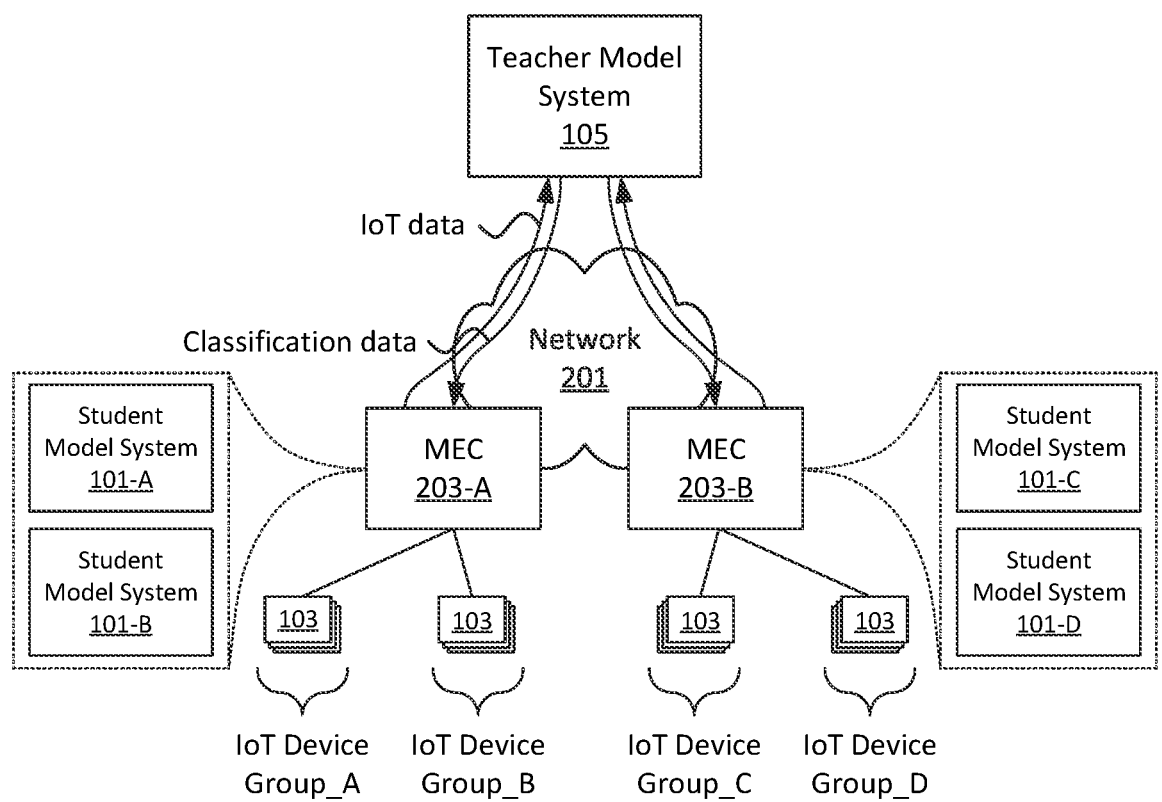
FIGS. 2-4 illustrate example deployments of a teacher model system and one or more student model systems, in accordance with one or more embodiments described herein.

In some embodiments, teacher model system 105 and/or student model systems 101 may be deployed at various devices or systems within, or communicatively coupled to, one or more networks or network devices. For example, as shown in FIG. 2, network 201 may include, and/or may be communicatively coupled to, one or more MECs 203 (e.g., MEC 203-A and 203-B, as shown in the example of FIG. 2). For example, as discussed below, network 201 may be or may include a core of a wireless network, such as a Long-Term Evolution ("LTE") Evolved Packet Core ("EPC"), a Fifth Generation ("5G") Core ("5GC"), and/or another type of core network. In some embodiments, network 201 may be, be include, and/or may be communicatively coupled to one or more RANs, such as a LTE RAN, a 5G RAN, and/or some other type of RAN. MECs 203 may be "edge" devices that are deployed in geographically diverse locations, such as co-located with one or more base stations of the one or more RANs of network 201. Traffic may, in some instances, be routed to and/or from MECs 203 (e.g., in lieu of to and/or from application servers or other resources that are accessible via network 201), which may provide improved latency for such traffic as compared to routing the traffic via other communication pathways associated with network 201.

As such, MECs 203 may be communicatively coupled to one or more IoT devices 103, which may communicate with MECs 203 via a respective base station of a RAN or other suitable communication pathway. For example, IoT devices 103 may include wireless communication circuitry and/or logic via which IoT devices 103 may communicate (e.g., via one or more base stations or other types of wireless interfaces) with MEC 203, network 201, and/or other devices or systems. Additionally, or alternatively, IoT devices 103 may include wired communication circuitry and/or logic via which IoT devices 103 may communicate with MEC 203, network 201, and/or other devices or systems.

In some embodiments, IoT devices 103 may be arranged, clustered, categorized, etc. into discrete groups. For example, as noted above, groups may be arranged on the basis of geographical location, device type, user and/or entity association, environment type or attributes (e.g., parking lot, train station, airport, highway, etc.), and/or other suitable attributes. In some embodiments, groups may be dynamic and may vary with time and/or other factors. For example, IoT devices 103 may be arranged into one set of groups during weekdays and another set of groups during weekends, may be arranged into one set of groups during scheduled events (e.g., sporting events, concerts, or the like) and another set of groups when such events are not scheduled, etc. In some embodiments, teacher model system 105 may receive information regarding groups of IoT devices 103 from a user information repository, such as a Home Subscriber Server ("HSS"), a Unified Data Management function ("UDM"), or other suitable device or system. In some embodiments, teacher model system 105 may identify discrete groups of IoT devices 103 on the basis of a particular geographical location associated with IoT devices 103, a particular MEC 203 from which IoT information associated with respective IoT devices 103 is received, or on some other basis. Similarly, MECs 203 may, in some embodiments, receive information regarding groups of IoT devices 103 from a user information repository, and/or may identify discrete groups of IoT devices 103 on some other basis.

In the example arrangement of FIG. 2, MECs 203 may receive sensor data (e.g., IoT data) from respective IoT devices 103, and may provide the sensor data to teacher model system 105. In some embodiments, as similarly described above, MECs 203 may aggregate, average, filter, and/or perform other operations prior to outputting the sensor data to teacher model system 105. In some embodiments, MECs 203 may output sensor data to teacher model system 105 without performing such operations.

In some embodiments, teacher model system 105 may be a "far cloud" system, in that the geographical location of teacher model system 105 may not be a factor based on which MECs 203 communicate with teacher model system 105. In some embodiments, MECs 203 may communicate with teacher model system 105 via network 201, the Internet, and/or one or more other networks. For example, teacher model system 105 may be an application server, cloud computing system, and/or other type of device or system that is accessible via network 201 and/or one or more other networks (e.g., the Internet). In some embodiments, teacher model system 105 may be, and/or may be implemented by, one or more devices, systems, Virtualized Network Function ("VNFs"), etc. associated with network 201. In such embodiments, MECs 203 may communicate with teacher model system 105 via a Service Capability Exposure Function ("SCEF"), a Network Exposure Function ("NEF"), and/or other type of interface. In some embodiments, MECs 203 and teacher model system 105 may be associated with a proprietary or dedicated interface or other type of communication pathway.

As discussed above, teacher model system 105 may utilize one or more AI/ML techniques or other suitable techniques to perform classifications, categorizations, etc. on the sensor data. For example, performing such classifications may including generating an "annotated" set of sensor data (e.g., "annotated" IoT data), which may include identifiers, attributes, and/or other descriptors of objects, trends, attributes, and/or other aspects of the source sensor data. Teacher model system 105 may provide the classification data (e.g., the "annotated" sensor data) to the respective MEC 203 from which teacher model system 105 received the annotated data.

In some embodiments, MECs 203 may maintain distinct models and/or sets of classifications associated with each group of IoT devices 103. For example, as shown, MEC 203-A may maintain and/or implement student model system 101-A for IoT Device Group_A and student model system 101-B for IoT Device Group B. Further, MEC 203-B may be a separate MEC from MEC 203-A, and may be implemented at a different geographical location from MEC 203-A and/or may otherwise be associated with different IoT devices 103 or groups of IoT devices 103 than MEC 203-A.

As such, MEC 203-B may provide sensor data associated with IoT devices 103 of IoT Device Group_C and IoT Device Group_D to teacher model system 105, may receive classification data for these IoT devices 103 or IoT device groups, and may maintain and/or implement respective student model systems 101 for these IoT device groups. For example, MEC 203-B may maintain and/or implement student model system 101-C for IoT Device Group_C, and student model system 101-D for IoT Device Group_D (e.g., based on different sets of classification data from teacher model system 105). For example, as discussed above, student model system 101-C may generate and/or refine one or more AI/ML models based on the classification data for IoT Device Group_C, and student model system 101-D may generate and/or refine one or more AI/ML models based on the classification data for IoT Device Group_D.

Based on the different sets of classification data, as noted above, respective student model systems 101 may categorize, classify, and/or perform other operations on sensor data received from IoT devices 103 of groups associated with student model systems 101. For example, when sensor data is received from IoT devices of IoT Device Group_A, student model system 101-A (e.g., as implemented by MEC 203-A) may use the one or more models generated and/or refined based on the classification data associated with IoT Device Group_A to classify, categorize, cluster, and/or perform other suitable operations on the received sensor data. Such classifications, categorizations, etc. may include operations such as image recognition techniques on still images or moving video, speech recognition on audio data, collision detection or prediction (e.g., in an autonomous or semi-autonomous vehicle), or other suitable operations. As the models generated, refined, maintained, etc. by student model system 101-A may be based on classifications determined by teacher model system 105, such models may be more accurate or yield fewer false positives or other anomalies than systems that utilize less complex or processing resource-intensive modeling techniques.

Figure 3:
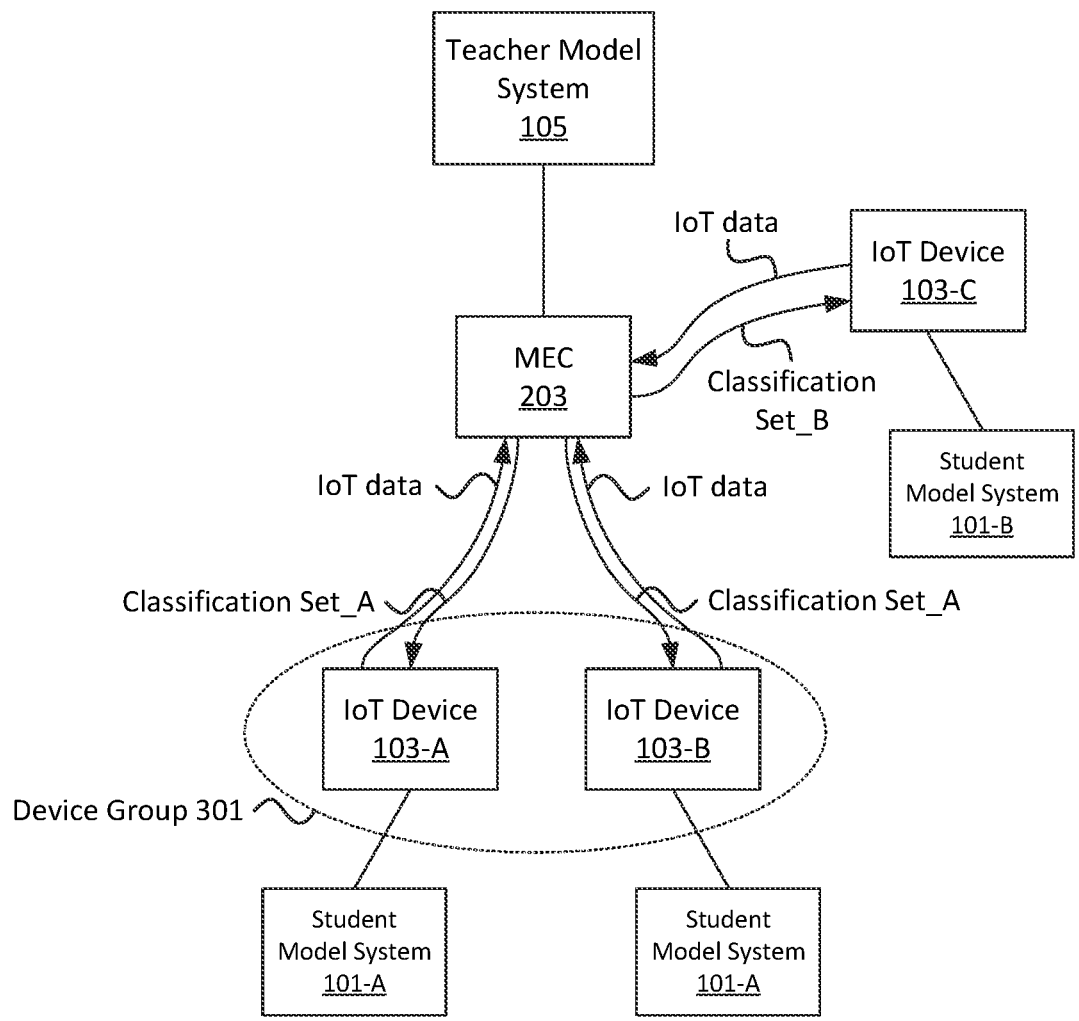

FIG. 3 illustrates another arrangement of teacher model system 105 and one or more student model systems 101 in accordance with embodiments described herein. As shown in FIG. 3, teacher model system 105 may be implemented at the MEC level, and student model system 101 may be implemented at the device (e.g., IoT device 103) level. For example, as similarly described above, MEC 203 may implement relatively complex, processing resource-intensive, and/or time-intensive AI/ML techniques in order to classify sensor data (e.g., IoT data) received from respective IoT devices 103 that are communicatively coupled to MEC 203, and may provide classification data to the respective IoT devices 103 based on such operations. IoT devices 103 may implement respective student model systems 101 that utilize relatively lightweight AI/ML, techniques to generate and/or refine one or more models based on the received classification data.

In some embodiments, MEC 203 may receive information indicating particular IoT device groups, and/or may otherwise identify IoT device groups. In the example here, MEC 203 may identify that IoT device 103-A and IoT device 103-B are in a particular device group 301. As such, MEC 203 may provide the same classification data (e.g., as performed on IoT data from IoT device 103-A and/or IoT device 103-B) to IoT devices 103-A and 103-B of device group 301. In this manner, IoT devices 103-A and 103-B may implement the same student model system 101-A (e.g., based on the same set of classification data). As such, models used by IoT devices 103 of the same group 301 may benefit from classifications performed, by teacher model system 105, on IoT data from other IoT devices 103 of group 301. On the other hand, IoT device 103-C may be not be in group 301, and may receive separate classification data (e.g., Classification Set_B), based on which IoT device 103-C may implement a different student model system 101-B with different models than those generated and/or refined by student model system 101-A.

Figure 4:
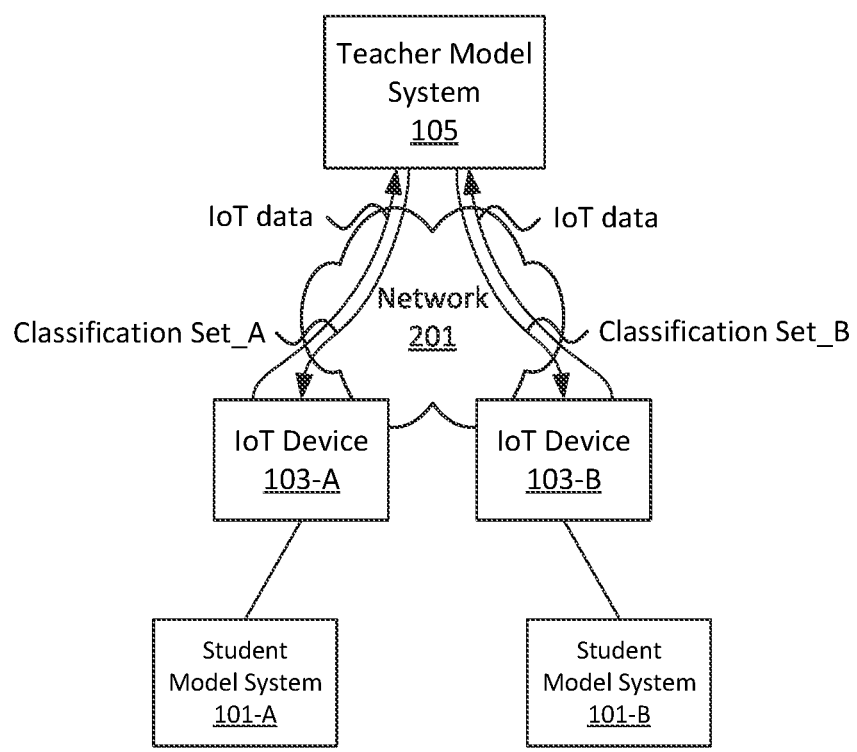

FIG. 4 illustrates another arrangement of teacher model system 105 and one or more IoT devices 103 in accordance with some embodiments. In the example shown here, IoT devices 103 may communicate with teacher model system 105 via network 201 (e.g., without involving one or more MECs 203). For example, teacher model system 105 may be implemented by an application server, a cloud computing system, and/or some other network-accessible resource. While not explicitly shown in this figure, teacher model system 105 may maintain information regarding groups of IoT devices 103, and may generate and/or provide classification information for a particular group to IoT devices 103 on a per-group basis, in order to maintain the classifications for the group.

Figure 5:
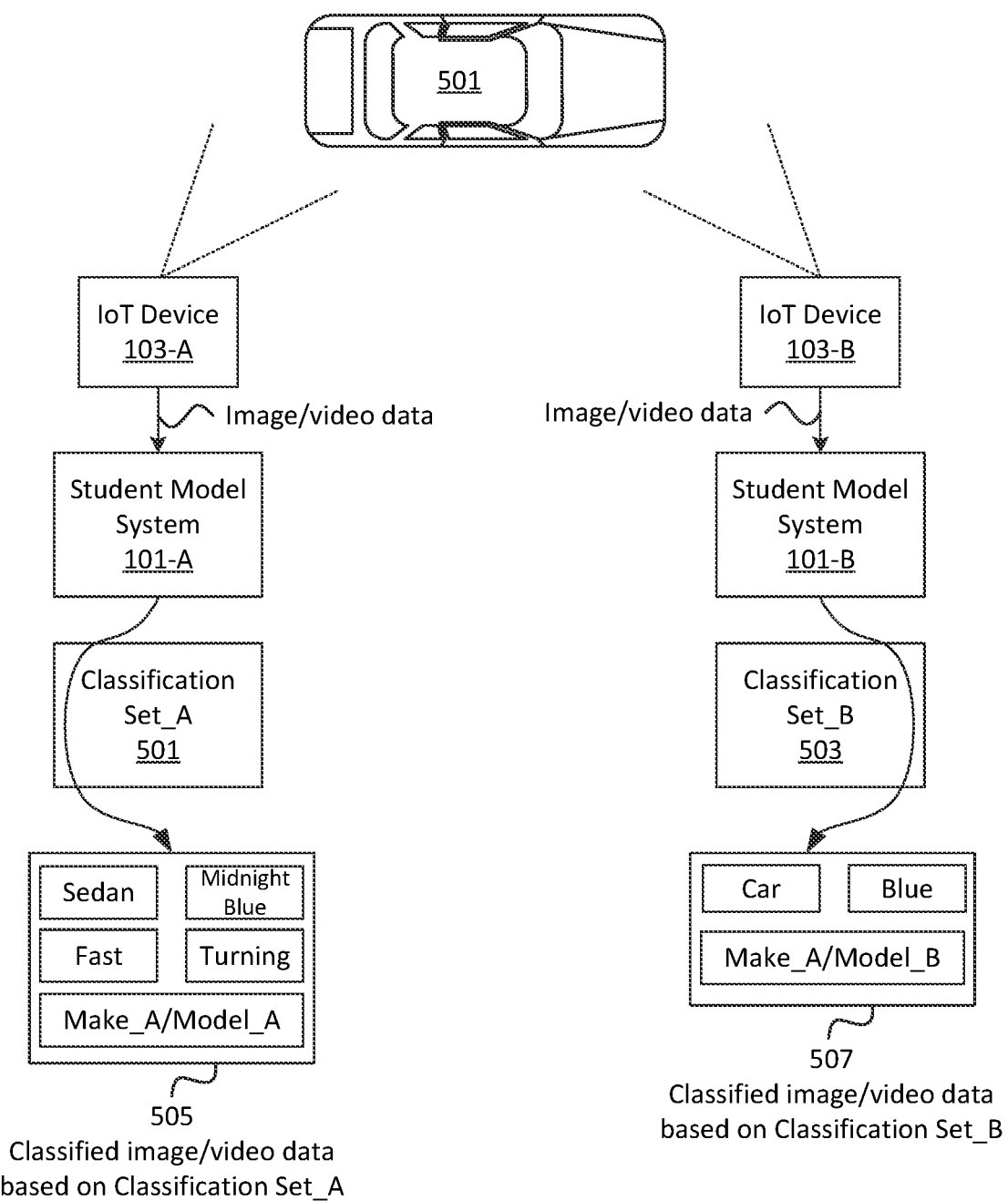
FIG. 5 illustrates an example of how the use of classification data, generated by a teacher model system, may provide accurate classifications of sensor data received in real time, in accordance with one or more embodiments described herein.

FIG. 5 illustrates an example scenario in which classification data, as provided by teacher model system 105 (e.g., determined based on relatively complex, processing- and/or time-intensive AI/ML, techniques as discussed above), may be used by one or more MECs 203 and/or IoT devices 103 to accurately classify detected IoT data without directly using some or all of the techniques utilized by teacher model system 105. In the example here, assume that IoT devices 103-A and 103-B include and/or are communicatively coupled to an image and/or video capture device (e.g., one or more cameras). As further shown, IoT devices 103-A and 103-B may capture image and/or video data depicting Vehicle 501. While shown as being captured simultaneously for the sake of explanation, in practice, IoT devices 103-A and 103-B may capture the image and/or video depicting Vehicle 501 at different times and/or at different locations.

As further shown, IoT device 103-A may implement and/or otherwise communicate with student model system 101-A (e.g., a particular MEC 203, to which IoT device 103-A is communicatively coupled, may implement student model system 101-A), and IoT device 103-B may implement and/or otherwise communicate with student model system 101-B. In accordance with examples described above, student model system 101-A may include and/or implement one or more AI/ML models generated or refined based on Classification Set_A 501, while student model system 101-B may include and/or implement one or more AI/ML models generated or refined based on Classification Set_B 503.

Student model system 101-A may perform image recognition techniques or other suitable techniques, based on Classification Set_A 501 (e.g., based on one or more models generated or refined based on Classification Set_A 501), in order to generate classifications 505 associated with the image and/or video data captured by IoT device 103-A. For example, as shown, classifications 505 may include tags, labels, classifications, etc. such as "sedan," "midnight blue," "fast," "turning," and "Make_A/Model_A" (e.g., a particular make and/or model of Classification Set_A 501). In some embodiments, some or all of these tags, labels, classifications, etc. may be included in Classification Set_A 501, as teacher model system 105 may have identified these specific attributes based on one or more complex AI/ML techniques, as discussed above.

On the other hand, student model system 101-B may not have received Classification Set_A 501, and therefore may not have generated and/or refined one or more models based on the specific attributes indicated in Classification Set_A 501. For example, student model system 101-B may have received Classification Set_B 503, which may include a different set of classifications than Classification Set_A 501.

As such, classifications 507, determined by student model system 101-B, may be less specific and/or less accurate than classifications 505 determined by student model system 101-A. For example, classifications 507 may include the classifications "car" and "blue," which may be less specific than the classifications "sedan" and "midnight" blue of classifications 505. Further, classifications 507 may include the classification "Make_A/Model_B," which may be inaccurate, or less accurate than the classification "Make_A/Model_A" determined by student model system 101-A based on Classification Set_A 501. For example, the "Make_A/Model_A" and "Make_A/Model_B" vehicles may be relatively similar, and the relatively lightweight AI/ML techniques utilized by student model systems 101-A and 101-B may not be able to reliably distinguish between these two vehicles without enhanced classification information from teacher model system 105. For example, the complex AI/ML techniques utilized by teacher model system 105 may be better able to distinguish between the "Make_A/Model_A" and "Make_A/Model_B" vehicles, and Classification Set_A 501 may include annotated data that assists student model system 101-A in making the distinction.

Figure 6:
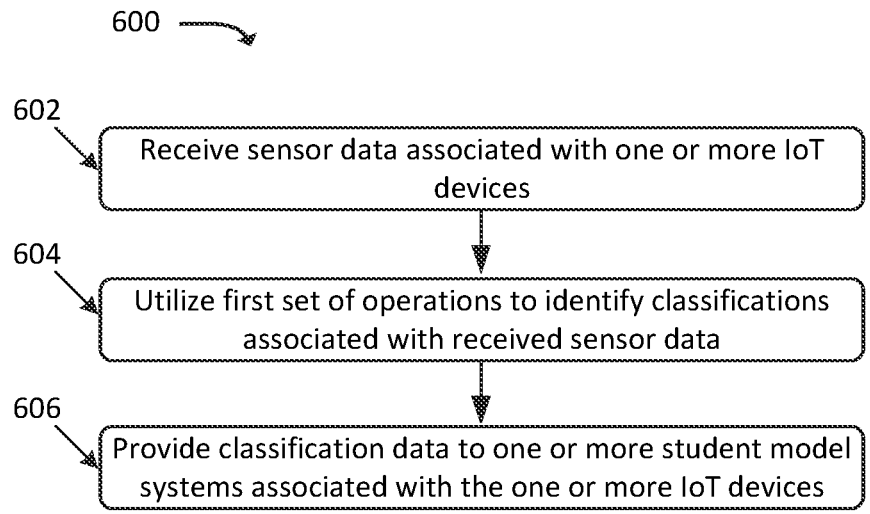
FIG. 6 illustrates an example process for utilizing resource and/or time-intensive analysis techniques for classifying one or more features of received sensor data, in accordance with one or more embodiments described herein.

FIG. 6 illustrates an example process 600 for utilizing resource and/or time-intensive analysis techniques (e.g., AI/ML techniques, classification techniques, etc.) for classifying one or more features of received sensor data (e.g., IoT data). In some embodiments, some or all of process 600 may be performed by teacher model system 105. In some embodiments, one or more other devices may perform some or all of process 600 in concert with, and/or in lieu of, teacher model system 105.

As shown, process 600 may include receiving (at 602) sensor data associated with one or more IoT devices 103. For example, teacher model system 105 may receive sensor data such as video data, still image data, audio data, temperature data, particulate matter data, acceleration data, and/or other types of data collected, measured, sensed, etc. by one or more IoT devices 103. As noted above, the sensor data may be received from, and/or may have been determined by one or more other types of devices in addition to, or in lieu of, IoT devices 103. Such devices may include one or more UEs, M2M devices, and/or other types of devices. In some embodiments, teacher model system 105 may receive aggregated sensor data (e.g., from student model system 101 and/or some other source) that includes and/or is derived from sensor data received from multiple sources, such as from multiple IoT devices 103 and/or other devices or systems.

Process 600 may further include utilizing (at 604) a first set of operations to identify classifications associated with the received sensor data. For example, as discussed above, teacher model system 105 may utilize relatively resource and/or time-intensive analysis techniques, including post-processing (e.g., non-real time) techniques to identify features of the sensor data. Such features may include identifying objects, attributes of objects, trends associated with the data, and/or other features. In some embodiments, the first set of operations may include utilizing relatively complex AI/ML techniques, such as an EfficientDet-D7 modeling technique, a Mask R-CNN technique, an image-based tracking technique, a three-dimensional tracking technique, a filtering technique, an error and/or outlier detection and/or elimination technique, or other suitable techniques. Further, as discussed above, the first set of operations may include utilizing relatively intensive parameters for the operations, which may include performing multiple passes on the same data, identifying data on a relatively granular basis (e.g., per pixel, per bit, etc.), or other parameters. The first set of operations may identify features of the data (e.g., pixels, bits, objects, shapes, colors, waveforms, etc.) as well as one or more classifications, categories, labels, or the like associated with features of the data. As noted above, the classifications may include, or may be associated with, "annotated" sensor data.

Process 600 may additionally include providing (at 606) classification data, indicating the determined classifications, to one or more student model systems 101 associated with the IoT devices 103. For example, teacher model system 105 may provide the classification data (e.g., the annotated sensor data) to the same device or system from which the sensor data was received (at 602). Additionally, or alternatively, teacher model system 105 may provide the classification data to one or more other devices or systems, such as IoT devices 103 and/or student model systems 101 in a same geographical region, group, category, etc. as the IoT device 103 associated with the received (at 602) sensor data.

Figure 7:
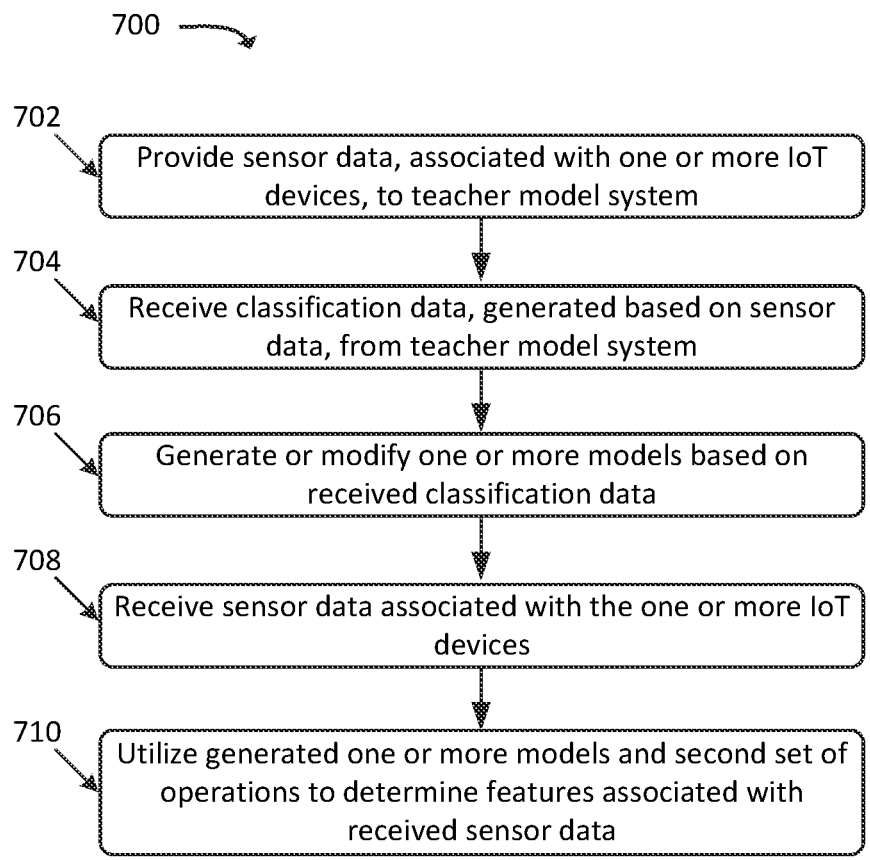
FIG. 7 illustrates an example process for utilizing classification data provided by a teacher model system to identify features of sensor data in real time or near-real time, in accordance with one or more embodiments described herein.

FIG. 7 illustrates an example process 700 for utilizing classification data (e.g., annotated sensor data) to generate one or more models that may be used by student model system 101 and/or IoT device 103 to identify features of sensor data in real time or near-real time. In some embodiments, some or all of process 700 may be performed by student model system 101. In some embodiments, one or more other devices may perform some or all of process 700 in concert with, and/or in lieu of, student model system 101 (e.g., IoT device 103). For example, as discussed above, student model system 101 may be implemented by IoT device 103, MEC 203, and/or some other suitable device or system.

As shown, process 700 may include providing (at 702) sensor data, associated with one or more IoT devices 103, to teacher model system 105. For example, as discussed above, student model system 101 may receive sensor data from multiple IoT devices 103, aggregate the sensor data, and provide the aggregated sensor data (and/or the initial source sensor data) to teacher model system 105.

Process 700 may further include receiving (at 704) classification data, generated based on the sensor data, from teacher model system 105. For example, as discussed above, teacher model system 105 may have utilized a first set of operations, which may be relatively resource and/or time-intensive, to generate the classification data.

Process 700 may additionally include generating or modifying (at 706) one or more models based on the received classification data. For example, such models may correlate features, attributes, etc. of sensor data to classifications, categories, etc. In some embodiments, student model system 101 may refine such models based on the received classification data, such as adding new classifications, strengthening existing classifications (e.g., in situations where the received classification data matches aspects of previously generated models), removing previously created classifications (e.g., in situations where the received classification data differs from aspects of previously generated models), and/or other suitable operations.

Process 700 may also include receiving (at 708) sensor data associated with one or more IoT devices 103. In some embodiments, the IoT devices 103 from which sensor data is received (at 708) may be the same IoT devices 103 for which sensor data was provided (at 702) to teacher model system 105. In some embodiments, the IoT devices 103 from which sensor data is received (at 708) may be different IoT devices 103 for which sensor data was provided (at 702) to teacher model system 105. For example, IoT devices 103 from which sensor data is received (at 708) may be in the same geographical location or otherwise the same group as the IoT devices 103 for which sensor data was provided (at 702) to teacher model system 105.

Process 700 may further include utilizing (at 710) the generated one or more models (e.g., which were generated and/or refined based on classification data received from teacher model system 105), as well as a second set of operations to determine features associated with the received (at 708) sensor data. For example, student model system 101 may utilize less resource and/or time-intensive operations than were utilized by teacher model system 105 to determine the classification data, in order to identify attributes, features, etc. associated with the received (at 708) sensor data. In some embodiments, student model system 101 may perform the second set of operations in real time or near-real time. In some embodiments, the second set of operations does not include post-processing operations. In some embodiments, the second set of operations may include a less granular set of parameters than are utilized in the first set of operations. For example, in situations where the first set of operations includes a per-bit analysis, a per-pixel analysis, etc., the second set of operations may include a per-byte analysis, a per-file analysis, a per-region analysis (e.g., on sets of pixels rather than individual pixels), or the like. In some embodiments, the second set of operations may include relatively less complex AI/ML techniques, such as an EfficientDet-D0 technique, a You Only Look Once ("YOLO") technique, or other type of lightweight modeling and/or classification technique. In this manner, student model system 101 may leverage the resources and/or time spent by teacher model system 105 to determine classifications, as well as the faster and/or less resource-intensive nature of the second set of operations to determine accurate classifications of sensor data in real time.

Such classifications may be used in autonomous vehicles to avoid collisions, maintain a safe distance between vehicles, identify and stop at stoplights, etc. In some embodiments, such classifications may be used for image recognition, speech recognition, Natural Language Processing ("NLP") techniques, or other suitable techniques.

Figure 8:
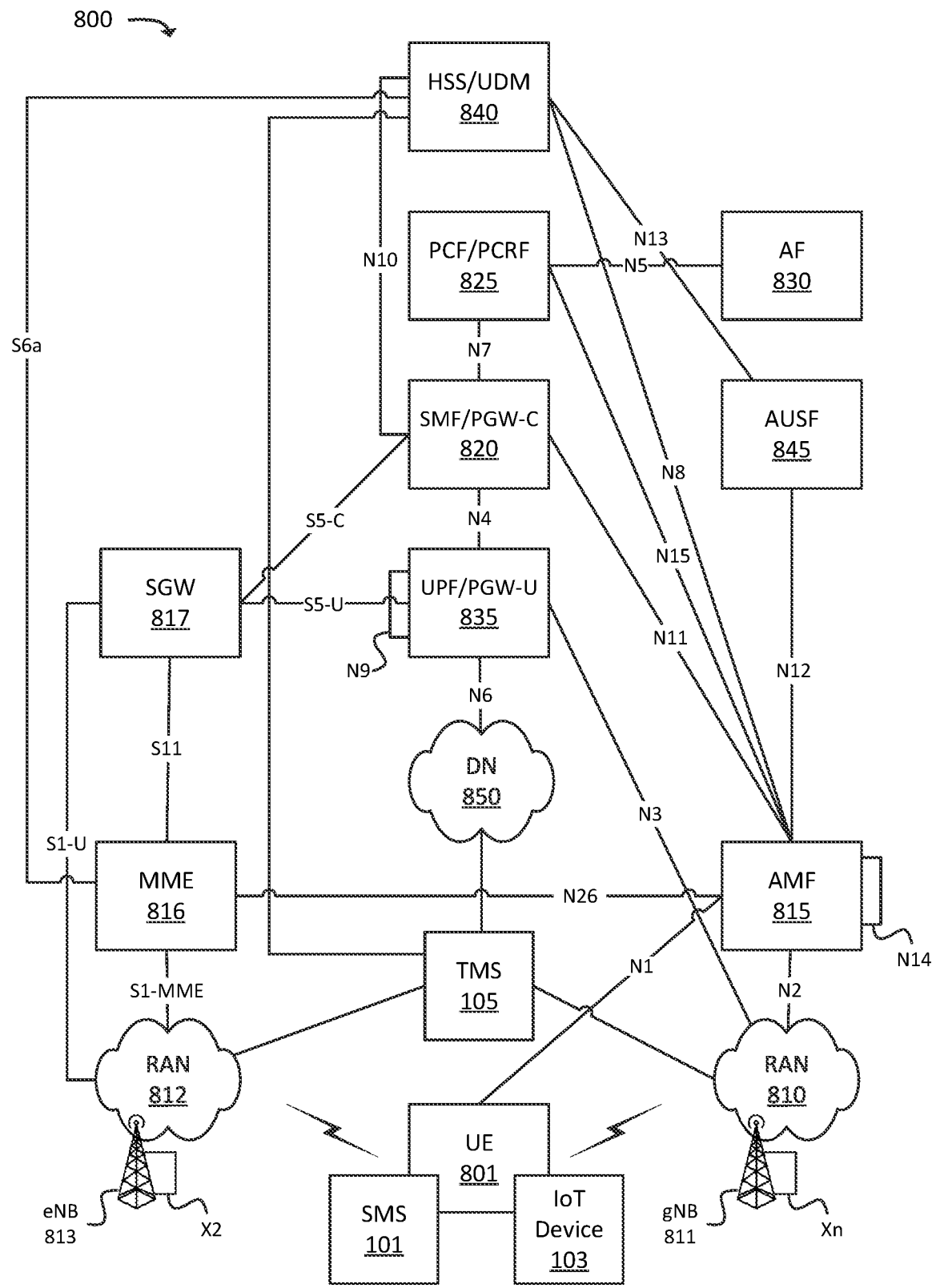
FIG. 8 illustrates an example environment in which one or more embodiments, described herein, may be implemented.

FIG. 8 illustrates an example environment 800, in which one or more embodiments may be implemented. In some embodiments, environment 800 may correspond to a Fifth Generation ("5G") network, and/or may include elements of a 5G network. In some embodiments, environment 800 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 800 may include UE 801, RAN 810 (which may include one or more Next Generation Node Bs ("gNBs") 811), RAN 812 (which may include one or more one or more evolved Node Bs ("eNBs") 813), and various network functions such as Access and Mobility Management Function ("AMF") 815, Mobility Management Entity ("MME") 816, Serving Gateway ("SGW") 817, Session Management Function ("SMF")/Packet Data Network ("PDN") Gateway ("PGW")-Control plane function ("PGW-C") 820, Policy Control Function ("PCF")/Policy Charging and Rules Function ("PCRF") 825, Application Function ("AF") 830, User Plane Function ("UPF")/PGW-User plane function ("PGW-U") 835, Home Subscriber Server ("HSS")/Unified Data Management ("UDM") 840, and Authentication Server Function ("AUSF") 845. Environment 800 may also include one or more networks, such as Data Network ("DN") 850. Environment 800 may include one or more additional devices or systems communicatively coupled to one or more networks (e.g., DN 850), such as student model system 101 and/or teacher model system 105.

The example shown in FIG. 8 illustrates one instance of each network component or function (e.g., one instance of SMF/PGW-C 820, PCF/PCRF 825, UPF/PGW-U 835, HSS/UDM 840, and/or 845). In practice, environment 800 may include multiple instances of such components or functions. For example, in some embodiments, environment 800 may include multiple "slices" of a core network, where each slice includes a discrete set of network functions (e.g., one slice may include a first instance of SMF/PGW-C 820, PCF/PCRF 825, UPF/PGW-U 835, HSS/UDM 840, and/or 845, while another slice may include a second instance of SMF/PGW-C 820, PCF/PCRF 825, UPF/PGW-U 835, HSS/UDM 840, and/or 845). The different slices may provide differentiated levels of service, such as service in accordance with different Quality of Service ("QoS") parameters.

The quantity of devices and/or networks, illustrated in FIG. 8, is provided for explanatory purposes only. In practice, environment 800 may include additional devices and/or networks, fewer devices and/or networks, different devices and/or networks, or differently arranged devices and/or networks than illustrated in FIG. 8. For example, while not shown, environment 800 may include devices that facilitate or enable communication between various components shown in environment 800, such as routers, modems, gateways, switches, hubs, etc. Alternatively, or additionally, one or more of the devices of environment 800 may perform one or more network functions described as being performed by another one or more of the devices of environment 800. Devices of environment 800 may interconnect with each other and/or other devices via wired connections, wireless connections, or a combination of wired and wireless connections. In some implementations, one or more devices of environment 800 may be physically integrated in, and/or may be physically attached to, one or more other devices of environment 800.

UE 801 may include a computation and communication device, such as a wireless mobile communication device that is capable of communicating with RAN 810, RAN 812, and/or DN 850. UE 801 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, a M2M device, or another type of mobile computation and communication device. UE 801 may send traffic to and/or receive traffic (e.g., user plane traffic) from DN 850 via RAN 810, RAN 812, and/or UPF/PGW-U 835.

In some embodiments, a particular UE 801 may be, may include, may be communicatively coupled to, and/or may be implemented by one or more IoT devices 103. As discussed above, UE 801 and/or IoT device 103 may include one or more sensors and/or other input devices, such as a camera, an accelerometer, a gyroscope, a microphone, a thermometer, a barometer, a LIDAR detector, a photosensor, and/or one or more other types of sensors. UE 801 and/or IoT device 103 may utilize such sensors to measure, sense, collect, etc. types of data with which such sensors are respectively configured to measure, sense, collect, etc.

In some embodiments, as discussed above, IoT device 103 and/or UE 801 may include, may implement, and/or may be communicatively coupled to student model system 101. As discussed above, for example, student model system 101 may receive sensor data measured, sensed, collected, etc. by IoT device 103 and/or UE 801, may aggregate such data, and may generate and/or refine one or more AI/ML models based on the sensor data. As further discussed above, student model system 101 may provide some or all of the sensor data to teacher model system 105, which may perform more resource and/or time-intensive computations, calculations, and/or other operations on the sensor data than student model system 101 is capable of performing. Teacher model system 105 may generate classification information based on performing such operations, and provide the classification information to student model system 101, based on which student model system 101 may generate, refine, modify, etc. one or more models based on the provided classification. Student model system 101 may use such models to perform real time or near-real time classification of subsequent sensor data identified by UE 801 and/or IoT device 103.

As discussed above, teacher model system 105 may be implemented by an application server or other type of device or system that is acceptable via DN 850. Additionally, or alternatively, teacher model system 105 may be implanted by, or communicatively coupled to, one or more elements of environment 800 (e.g., "internal" components of the core network).

RAN 810 may be, or may include, a 5G RAN that includes one or more base stations (e.g., one or more gNBs 811), via which UE 801 may communicate with one or more other elements of environment 800. UE 801 may communicate with RAN 810 via an air interface (e.g., as provided by gNB 811). For instance, RAN 810 may receive traffic (e.g., voice call traffic, data traffic, messaging traffic, signaling traffic, etc.) from UE 801 via the air interface, and may communicate the traffic to UPF/PGW-U 835, and/or one or more other devices or networks. Similarly, RAN 810 may receive traffic intended for UE 801 (e.g., from UPF/PGW-U 835, AMF 815, and/or one or more other devices or networks) and may communicate the traffic to UE 801 via the air interface.

RAN 812 may be, or may include, a LTE RAN that includes one or more base stations (e.g., one or more eNBs 813), via which UE 801 may communicate with one or more other elements of environment 800. UE 801 may communicate with RAN 812 via an air interface (e.g., as provided by eNB 813). For instance, RAN 810 may receive traffic (e.g., voice call traffic, data traffic, messaging traffic, signaling traffic, etc.) from UE 801 via the air interface, and may communicate the traffic to UPF/PGW-U 835, and/or one or more other devices or networks. Similarly, RAN 810 may receive traffic intended for UE 801 (e.g., from UPF/PGW-U 835, SGW 817, and/or one or more other devices or networks) and may communicate the traffic to UE 801 via the air interface.

AMF 815 may include one or more devices, systems, Virtualized Network Functions ("VNFs"), etc., that perform operations to register UE 801 with the 5G network, to establish bearer channels associated with a session with UE 801, to hand off UE 801 from the 5G network to another network, to hand off UE 801 from the other network to the 5G network, manage mobility of UE 801 between RANs 810 and/or gNBs 811, and/or to perform other operations. In some embodiments, the 5G network may include multiple AMFs 815, which communicate with each other via the N14 interface (denoted in FIG. 8 by the line marked "N14" originating and terminating at AMF 815).

MME 816 may include one or more devices, systems, VNFs, etc., that perform operations to register UE 801 with the EPC, to establish bearer channels associated with a session with UE 801, to hand off UE 801 from the EPC to another network, to hand off UE 801 from another network to the EPC, manage mobility of UE 801 between RANs 812 and/or eNBs 813, and/or to perform other operations.

SGW 817 may include one or more devices, systems, VNFs, etc., that aggregate traffic received from one or more eNBs 813 and send the aggregated traffic to an external network or device via UPF/PGW-U 835. Additionally, SGW 817 may aggregate traffic received from one or more UPF/PGW-Us 835 and may send the aggregated traffic to one or more eNBs 813. SGW 817 may operate as an anchor for the user plane during inter-eNB handovers and as an anchor for mobility between different telecommunication networks or RANs (e.g., RANs 810 and 812).

SMF/PGW-C 820 may include one or more devices, systems, VNFs, etc., that gather, process, store, and/or provide information in a manner described herein. SMF/PGW-C 820 may, for example, facilitate in the establishment of communication sessions on behalf of UE 801. In some embodiments, the establishment of communications sessions may be performed in accordance with one or more policies provided by PCF/PCRF 825.

PCF/PCRF 825 may include one or more devices, systems, VNFs, etc., that aggregate information to and from the 5G network and/or other sources. PCF/PCRF 825 may receive information regarding policies and/or subscriptions from one or more sources, such as subscriber databases and/or from one or more users (such as, for example, an administrator associated with PCF/PCRF 825).

AF 830 may include one or more devices, systems, VNFs, etc., that receive, store, and/or provide information that may be used in determining parameters (e.g., quality of service parameters, charging parameters, or the like) for certain applications.

UPF/PGW-U 835 may include one or more devices, systems, VNFs, etc., that receive, store, and/or provide data (e.g., user plane data). For example, UPF/PGW-U 835 may receive user plane data (e.g., voice call traffic, data traffic, etc.), destined for UE 801, from DN 850, and may forward the user plane data toward UE 801 (e.g., via RAN 810, SMF/PGW-C 820, and/or one or more other devices). In some embodiments, multiple UPFs 835 may be deployed (e.g., in different geographical locations), and the delivery of content to UE 801 may be coordinated via the N9 interface (e.g., as denoted in FIG. 8 by the line marked "N9" originating and terminating at UPF/PGW-U 835). Similarly, UPF/PGW-U 835 may receive traffic from UE 801 (e.g., via RAN 810, SMF/PGW-C 820, and/or one or more other devices), and may forward the traffic toward DN 850. In some embodiments, UPF/PGW-U 835 may communicate (e.g., via the N4 interface) with SMF/PGW-C 820, regarding user plane data processed by UPF/PGW-U 835.

HSS/UDM 840 and AUSF 845 may include one or more devices, systems, VNFs, etc., that manage, update, and/or store, in one or more memory devices associated with AUSF 845 and/or HSS/UDM 840, profile information associated with a subscriber. AUSF 845 and/or HSS/UDM 840 may perform authentication, authorization, and/or accounting operations associated with the subscriber and/or a communication session with UE 801.

DN 850 may include one or more wired and/or wireless networks. For example, DN 850 may include an Internet Protocol ("IP")-based PDN, a wide area network ("WAN") such as the Internet, a private enterprise network, and/or one or more other networks. UE 801 may communicate, through DN 850, with data servers, other UEs 801, and/or to other servers or applications that are coupled to DN 850. DN 850 may be connected to one or more other networks, such as a public switched telephone network ("PSTN"), a public land mobile network ("PLMN"), and/or another network. DN 850 may be connected to one or more devices, such as content providers, applications, web servers, and/or other devices, with which UE 801 may communicate.

Figure 9:
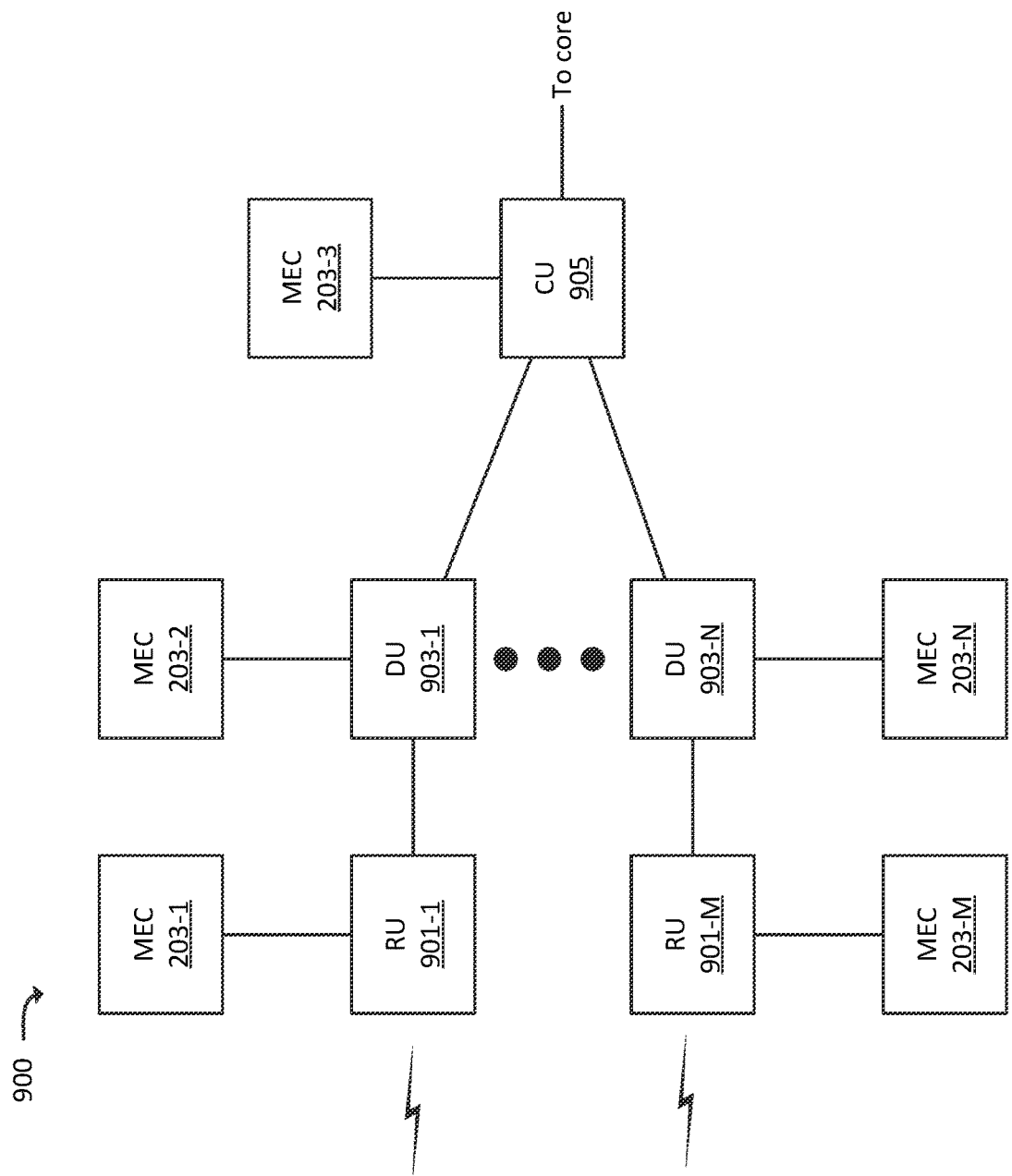
FIG. 9 illustrates an example arrangement of a radio access network ("RAN"), in accordance with some embodiments.

FIG. 9 illustrates an example Distributed Unit ("DU") network 900, which may be included in and/or implemented by one or more RANs (e.g., RAN 810, RAN 812, or some other RAN). In some embodiments, a particular RAN may include one DU network 900. In some embodiments, a particular RAN may include multiple DU networks 900. In some embodiments, DU network 900 may correspond to a particular gNB 811 of a 5G RAN (e.g., RAN 810). In some embodiments, DU network 900 may correspond to multiple gNBs 811. In some embodiments, DU network 900 may correspond to one or more other types of base stations of one or more other types of RANs. As shown, DU network 900 may include Central Unit ("CU") 905, one or more Distributed Units ("DUs") 903-1 through 903-N (referred to individually as "DU 903," or collectively as "DUs 903"), and one or more Radio Units ("RUs") 901-1 through 901-M (referred to individually as "RU 901," or collectively as "RUs 901").

CU 905 may communicate with a core of a wireless network (e.g., may communicate with one or more of the devices or systems described above with respect to FIG. 8, such as AMF 815 and/or UPF/PGW-U 835). In the uplink direction (e.g., for traffic from UEs 801 to a core network), CU 905 may aggregate traffic from DUs 903, and forward the aggregated traffic to the core network. In some embodiments, CU 905 may receive traffic according to a given protocol (e.g., Radio Link Control ("RLC")) from DUs 903, and may perform higher-layer processing (e.g., may aggregate/process RLC packets and generate Packet Data Convergence Protocol ("PDCP") packets based on the RLC packets) on the traffic received from DUs 903.

In accordance with some embodiments, CU 905 may receive downlink traffic (e.g., traffic from the core network) for a particular UE 801, and may determine which DU(s) 903 should receive the downlink traffic. DU 903 may include one or more devices that transmit traffic between a core network (e.g., via CU 905) and UE 801 (e.g., via a respective RU 901). DU 903 may, for example, receive traffic from RU 901 at a first layer (e.g., physical ("PHY") layer traffic, or lower PHY layer traffic), and may process/aggregate the traffic to a second layer (e.g., upper PHY and/or RLC). DU 903 may receive traffic from CU 905 at the second layer, may process the traffic to the first layer, and provide the processed traffic to a respective RU 901 for transmission to UE 801.

RU 901 may include hardware circuitry (e.g., one or more RF transceivers, antennas, radios, and/or other suitable hardware) to communicate wirelessly (e.g., via an RF interface) with one or more UEs 801, one or more other DUs 903 (e.g., via RUs 901 associated with DUs 903), and/or any other suitable type of device. In the uplink direction, RU 901 may receive traffic from UE 801 and/or another DU 903 via the RF interface and may provide the traffic to DU 903. In the downlink direction, RU 901 may receive traffic from DU 903, and may provide the traffic to UE 801 and/or another DU 903.

RUs 901 may, in some embodiments, be communicatively coupled to one or more Multi-Access/Mobile Edge Computing ("MEC") devices, referred to sometimes herein simply as "MECs" 203. For example, RU 901-1 may be communicatively coupled to MEC 203-1, RU 901-M may be communicatively coupled to MEC 203-M, DU 903-1 may be communicatively coupled to MEC 203-2, DU 903-N may be communicatively coupled to MEC 203-N, CU 905 may be communicatively coupled to MEC 203-3, and so on. MECs 203 may include hardware resources (e.g., configurable or provisionable hardware resources) that may be configured to provide services and/or otherwise process traffic to and/or from UE 801, via a respective RU 901.

For example, RU 901-1 may route some traffic, from UE 801, to MEC 203-1 instead of to a core network (e.g., via DU 903 and CU 905). MEC 203-1 may process the traffic, perform one or more computations based on the received traffic, and may provide traffic to UE 801 via RU 901-1. In this manner, ultra-low latency services may be provided to UE 801, as traffic does not need to traverse DU 903, CU 905, and an intervening backhaul network between DU network 900 and the core network. In some embodiments, MEC 203 may include, and/or may implement, some or all of the functionality described above with respect to student model system 101 and/or teacher model system 105.

Figure 10:
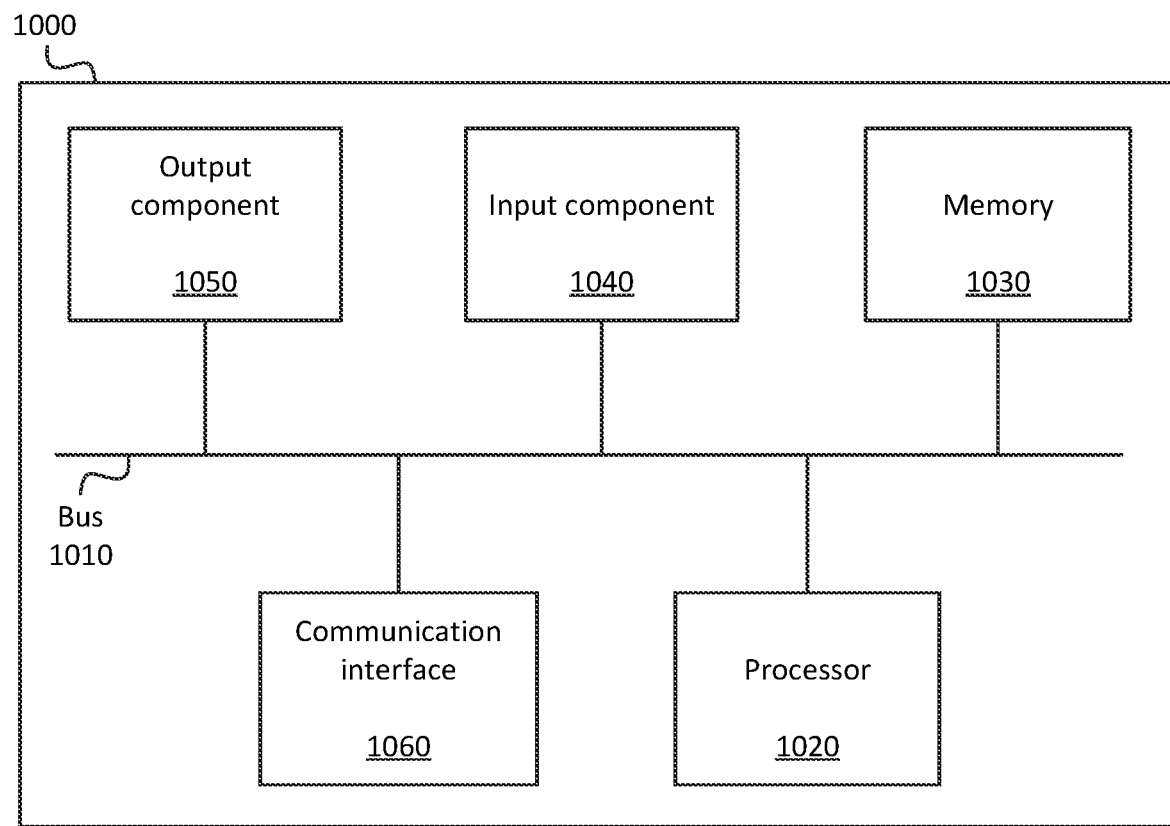
FIG. 10 illustrates example components of one or more devices, in accordance with one or more embodiments described herein.

FIG. 10 illustrates example components of device 1000. One or more of the devices described above may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000 and/or other receives or detects input from a source external to 1040, such as a touchpad, a touchscreen, a keyboard, a keypad, a button, a switch, a microphone or other audio input component, etc. In some embodiments, input component 1040 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-6), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A system, comprising:
   a far cloud device configured to:
      receive first sensor data associated with a first device that is associated with a particular geographical region;
      utilize a first set of operations to identify a first set of classifications associated with the first sensor data;
      generate or modify one or more models associated with the particular geographical region based on the first set of classifications;
      select, from a plurality of Multi-Access/Mobile Edge Computing ("MEC") devices, a particular MEC device that is associated with the particular geographical region; and
      provide the one or more models to the selected particular MEC device;
   wherein the particular MEC device is configured to:
      receive second sensor data associated with a second device that is associated with the particular geographical region;
      utilize the one or more models generated based on the first set of classifications and further utilize a second set of operations, that is different from the first set of operations, to identify a second set of classifications associated with the second sensor data; and
      provide the second set of classifications to an autonomous or semi-autonomous vehicle, wherein operation of the autonomous or semi-autonomous vehicle is based on the second set of classifications.

2. The system of claim 1, wherein the first sensor data and the second sensor data include video data, wherein the first set of operations includes a tracking operation performed on the video data of the first sensor data, and wherein the second set of operations does not include the tracking operation performed on the video data of the second sensor data.

3. The system of claim 2, wherein the tracking operation includes identifying a particular object depicted in the video data and a path associated with the object.

4. The system of claim 1, wherein the first set of operations include one or more post-processing operations performed on the first sensor data, wherein the second set of operations do not include the one or more post-processing operations performed on the second sensor data.

5. The system of claim 1, wherein the first set of operations include one or more filtering operations performed on the first sensor data, wherein the second set of operations do not include the one or more filtering operations performed on the second sensor data.

6. The system of claim 1, wherein the first and second sensor data include a same type of data.

7. A non-transitory computer-readable medium, storing a plurality of processor-executable instructions to:
   receive, by a far cloud device, first sensor data associated with a first device that is associated with a particular geographical region;
   utilize, by the far cloud device, a first set of operations to identify a first set of classifications associated with the first sensor data;
   generate or modify, by the far cloud device, one or more models associated with the particular geographical region based on the first set of classifications;
   select, by the far cloud device and from a plurality of Multi-Access/Mobile Edge Computing ("MEC") devices, a particular MEC device that is associated with the particular geographical region;
   provide, by the far cloud device, the one or more models to the selected particular MEC device;
   receive, by the MEC device, second sensor data associated with a second device that is associated with the particular geographical region;
   utilize, by the MEC device, the one or more models generated based on the first set of classifications and further utilize a second set of operations, that is different from the first set of operations, to identify a second set of classifications associated with the second sensor data; and
   provide, by the MEC device, the second set of classifications to an autonomous or semi-autonomous vehicle, wherein operation of the autonomous or semi-autonomous vehicle is based on the second set of classifications.

8. The non-transitory computer-readable medium of claim 7, wherein the first and second sensor data include a same type of data.

9. The non-transitory computer-readable medium of claim 8, wherein the first and second sensor data each include at least one of:
   video data,
   still image data, or
   audio data.

10. The non-transitory computer-readable medium of claim 8, wherein the first sensor data and the second sensor data include video data, wherein the first set of operations includes a tracking operation performed on the video data of the first sensor data, and wherein the second set of operations does not include the tracking operation performed on the video data of the second sensor data.

11. The non-transitory computer-readable medium of claim 10, wherein the tracking operation includes identifying a particular object depicted in the video data and a path associated with the object.

12. The non-transitory computer-readable medium of claim 7, wherein the first set of operations include one or more post-processing operations performed on the first sensor data, wherein the second set of operations do not include the one or more post-processing operations performed on the second sensor data.

13. The non-transitory computer-readable medium of claim 7, wherein the first set of operations include one or more filtering operations performed on the first sensor data, wherein the second set of operations do not include the one or more filtering operations performed on the second sensor data.

14. A method, comprising:
   receiving, by a far cloud device, first sensor data associated with a first device that is associated with a particular geographical region;
   utilizing, by the far cloud device, a first set of operations to identify a first set of classifications associated with the first sensor data;
   generating or modifying, by the far cloud device, one or more models associated with the particular geographical region based on the first set of classifications;
   selecting, by the far cloud device and from a plurality of Multi-Access/Mobile Edge Computing ("MEC") devices, a particular MEC device that is associated with the particular geographical region;
   providing, by the far cloud device, the one or more models to the selected particular MEC device;
   receiving, by the MEC device, second sensor data associated with a second device that is associated with the particular geographical region;
   utilizing, by the MEC device, the one or more models generated based on the first set of classifications and further utilize a second set of operations, that is different from the first set of operations, to identify a second set of classifications associated with the second sensor data; and
   providing, by the MEC device, the second set of classifications to an autonomous or semi-autonomous vehicle, wherein operation of the autonomous or semi-autonomous vehicle is based on the second set of classifications.

15. The method of claim 14, wherein the first sensor data and the second sensor data include video data, wherein the first set of operations includes a tracking operation performed on the video data of the first sensor data, and wherein the second set of operations does not include the tracking operation performed on the video data of the second sensor data.

16. The method of claim 15, wherein the tracking operation includes identifying a particular object depicted in the video data and a path associated with the object.

17. The method of claim 14, wherein the first set of operations include one or more post-processing operations performed on the first sensor data, wherein the second set of operations do not include the one or more post-processing operations performed on the second sensor data.

18. The method of claim 14, wherein the first set of operations include one or more filtering operations performed on the first sensor data, wherein the second set of operations do not include the one or more filtering operations performed on the second sensor data.

19. The method of claim 14, wherein the first and second sensor data include a same type of data.

20. The method of claim 19, wherein the first and second sensor data each include at least one of:
   video data,
   still image data, or
   audio data.

* * * * *